(12) United States Patent
Kwon et al.

(10) Patent No.: US 9,652,704 B2
(45) Date of Patent: May 16, 2017

(54) METHOD OF PROVIDING CONTENT TRANSMISSION SERVICE BY USING PRINTED MATTER

(71) Applicant: DS GLOBAL, Seoul (KR)

(72) Inventors: Jun Kyoung Kwon, Seoul (KR); Sam Hee Lee, Bucheon-si (KR)

(73) Assignee: DS GLOBAL, Seoul (KR)

( * ) Notice: Subject to any disclaimer, the term of this patent is extended or adjusted under 35 U.S.C. 154(b) by 0 days.

(21) Appl. No.: 14/907,917

(22) PCT Filed: Aug. 7, 2014

(86) PCT No.: PCT/KR2014/007314
§ 371 (c)(1),
(2) Date: Jan. 27, 2016

(87) PCT Pub. No.: WO2015/020451
PCT Pub. Date: Feb. 12, 2015

(65) Prior Publication Data
US 2016/0171357 A1    Jun. 16, 2016

(30) Foreign Application Priority Data
Aug. 9, 2013  (KR) .......................... 10-2013-0094645

(51) Int. Cl.
*G06K 19/06* (2006.01)
*G06Q 50/10* (2012.01)
*H04N 1/00* (2006.01)

(52) U.S. Cl.
CPC ....... *G06K 19/06009* (2013.01); *G06Q 50/10* (2013.01); *H04N 1/00* (2013.01); *H04N 1/00352* (2013.01); *H04N 1/00856* (2013.01)

(58) Field of Classification Search
USPC ................ 358/2.1, 3.31, 1.15, 1.18
See application file for complete search history.

(56) References Cited

U.S. PATENT DOCUMENTS

2014/0240735 A1* 8/2014 Salgado ................ G06F 3/1204
358/1.13
2014/0367461 A1* 12/2014 Raina ................ G06F 17/30126
235/375

FOREIGN PATENT DOCUMENTS

KR    1020010097850    11/2001
KR    1020050026769    3/2005
(Continued)

OTHER PUBLICATIONS

International Search Report—PCT/KR2014/007314 dated Nov. 11, 2014.

*Primary Examiner* — Marcellus Augustin
(74) *Attorney, Agent, or Firm* — Cantor Colburn LLP

(57) ABSTRACT

Provided is a content delivery service method using printed matter. The content delivery service method using printed matter may include executing, by a first terminal, a service app and selecting an image, editing content on the selected image in an app screen, sending, by the first terminal, the image and information about the edited content to a server, storing, by the server, the image and the information about the edited content and sending information about the storage to the first terminal, generating, by the first terminal, specific recognition code in which the storage information has been recorded and inserting the specific recognition code into the image, and sending, by the first terminal, the image into which the recognition code has been inserted to a printing device so that the image is printed by the printing device.

20 Claims, 14 Drawing Sheets

(56) References Cited

FOREIGN PATENT DOCUMENTS

| KR | 1020050118002 | 12/2005 |
| KR | 1020090037590 | 4/2009 |
| KR | 1020100004103 | 1/2010 |
| KR | 1020110098582 | 9/2011 |
| KR | 1020120083015 | 7/2012 |
| KR | 1020140061616 | 5/2014 |

* cited by examiner

METHOD OF PROVIDING CONTENT TRANSMISSION SERVICE BY USING PRINTED MATTER

BACKGROUND OF THE INVENTION

1. Technical Field

The present invention relates to a content delivery service method using printed matter and, more particularly, to a content delivery service method using printed matter, wherein when a service subscriber A edits content to be delivered along with an image, codes the edited content, and prints the coded content, a service subscriber B may check the edited content along with the image by decoding recognition code of the printed matter although the content does not appear in the printed matter itself.

2. Description of the Related Art

QR code is an abbreviation of "Quick Response" code and was derived from Quick Response, that is, the registered trademark of Denso Wave Co. in Japan. QR code is two-dimensional (2D) barcode obtained by supplementing the capacity limit of the existing barcode and extending the format and contents of the existing barcode. If QR code is scanned using a mobile phone or a smart phone recognizer, a home page that provides information is automatically connected. QR code is used as company advertising means because it is advantageous in that it can store video in addition to text data, such as numbers, Chinese characters, and the alphabet. A maximum of 7,089 numbers, a maximum of 4,296 letters in the case of text, and a maximum of 1,817 letters in the case of Asian text, such as Chinese characters, can be stored in QR code.

Barcode has information only in one direction, whereas QR code has information in two horizontal and vertical directions, thus significantly increasing the amount of information that may be recorded.

A smart phone that has been spread rapidly in recent years is combined with the functions of mobile communication and a personal computer (functions for installing an operating system, driving apps, and performing Internet access), and thus has becomes part of the real life of the modern.

Furthermore, a variety of types of applications (hereinafter call an "app") for smart phones have been developed and also continue to be advanced, thus providing a lot of convenience through ideas useful in the real life.

The spread of smart phones and the development of smart phone apps continue to be expanded, but the spread of QR code or technologies using QR code is still an insignificant level compared to availability and practical use inherent in QR code. In a prior art, when QR code is scanned, a designated web is simply accessed, and input information is merely viewed.

SUMMARY OF THE INVENTION

Accordingly, the present invention has been made keeping in mind the above problems occurring in the prior art, and an object of the present invention is to provide a content delivery service method using printed matter, wherein when a service subscriber A edits content to be delivered along with an image, codes the edited content, and prints the coded content, the edited content does not appear in the printed matter itself.

Another object of the present invention is to provide a content delivery service method using printed matter, wherein a service subscriber B who has received printed matter from a service subscriber A may check content edited by the service subscriber A along with an image by decoding recognition code of the printed matter.

Yet another object of the present invention is to provide a content delivery service method using printed matter, wherein an image itself selected by a service subscriber A is not stored in a server, but is captured from printed matter that has been transferred offline, thereby being capable of significantly reducing the capacity load of the server.

In accordance with an embodiment of the present invention, there is provided a content delivery service method using printed matter, including executing, by a first terminal, a service app and selecting an image; editing content on the selected image in an app screen; sending, by the first terminal, the image and information about the edited content to a server; storing, by the server, the image and the information about the edited content and sending information about the storage to the first terminal; generating, by the first terminal, specific recognition code in which the storage information has been recorded and inserting the specific recognition code into the image; and sending, by the first terminal, the image into which the recognition code has been inserted to a printing device so that the image is printed by the printing device.

The content delivery service method may further include executing, by a second terminal, a service app and detecting the information about the storage by recognizing the recognition code in printed matter that has been offline delivered; accessing, by the second terminal, the server based on the detected storage information and receiving the image and the content edit information from the server; and representing or executing, by the second terminal, the image and the edited content based on the received edit information.

In accordance with another embodiment of the present invention, there is provided a content delivery service method using printed matter, including executing, by a first terminal, a service app and selecting an image; editing content on the selected image in an app screen; sending, by the first terminal, information about the edited content to a server; storing, by the server, the information about the edited content and sending information about the storage to the first terminal; generating, by the first terminal, specific recognition code in which the storage information has been recorded and inserting the specific recognition code into the image; and sending, by the first terminal, the image into which the recognition code has been inserted to a printing device so that the image is printed by the printing device.

The content delivery service method may preferably further include offline delivering printed matter printed by the printing device; executing, by a second terminal, a service app, obtaining the image of the printed matter, and recognizing the recognition code in the printed matter; detecting the storage information recorded in the recognition code, accessing, by the second terminal, the server based on the detected storage information, and receiving the content edit information from the server; and displaying, by the second terminal, the image of the printed matter and representing or executing the content based on the received edit information.

Furthermore, the content may preferably include at least any one of text, a sound, an emoticon, two-dimensional (2D) animation, three-dimensional (3D) animation, a sticker, and a video.

Furthermore, the app screen may preferably provide at least any one of text input mode, sound input mode, emoticon input mode, 2D animation input mode, 3D animation input mode, sticker input mode, and video input mode so that a user is able to edit the content on the selected image.

Furthermore, the app screen of the terminal A may preferably provide a password setting menu.

Furthermore, the app screen of the terminal B may preferably provide a password input window.

Furthermore, the content edit information may preferably include one or more of the type, contents, angle, size, color, execution order, coordinate information, and priority of the content.

Furthermore, the storage information recorded in the recognition code may preferably include the serial number of the repository of the server or information about the URL of the server in which the image or the content edit information is stored.

The content delivery service method may preferably further include storing the content edited on the image in the first terminal after editing the content is edited on the image.

Furthermore, the service app may preferably include an album for storing the image whose content has been edited.

In accordance with yet another embodiment of the present invention, there is provided a content delivery service method using printed matter, including executing, by a first terminal, a service app and selecting an image; editing content on the selected image in an app screen; generating, by the first terminal, specific recognition code in which contents of the content have been recorded and inserting the specific recognition code into the image; and sending, by the first terminal, the image into which the recognition code has been inserted to a printing device so that the image is printed by the printing device.

The content delivery service method may preferably further include offline delivering printed matter printed by the printing device; executing, by a second terminal, a service app and obtaining the image of the printed matter; recognizing the recognition code in the printed matter and extracting the recorded contents of the content; and overlapping and representing or executing, by the second terminal, the obtained image and the extracted content.

Furthermore, recognizing the recognition code in the printed matter and extracting the recorded contents of the content may preferably include extracting the contents of the content recorded in a data region of the recognition code and converting the extracted contents of the content into content capable of being displayed on a screen of the second terminal.

DETAILED DESCRIPTION

Some exemplary embodiments of the present invention are described in detail with reference to the accompanying drawings.

Figure 1:
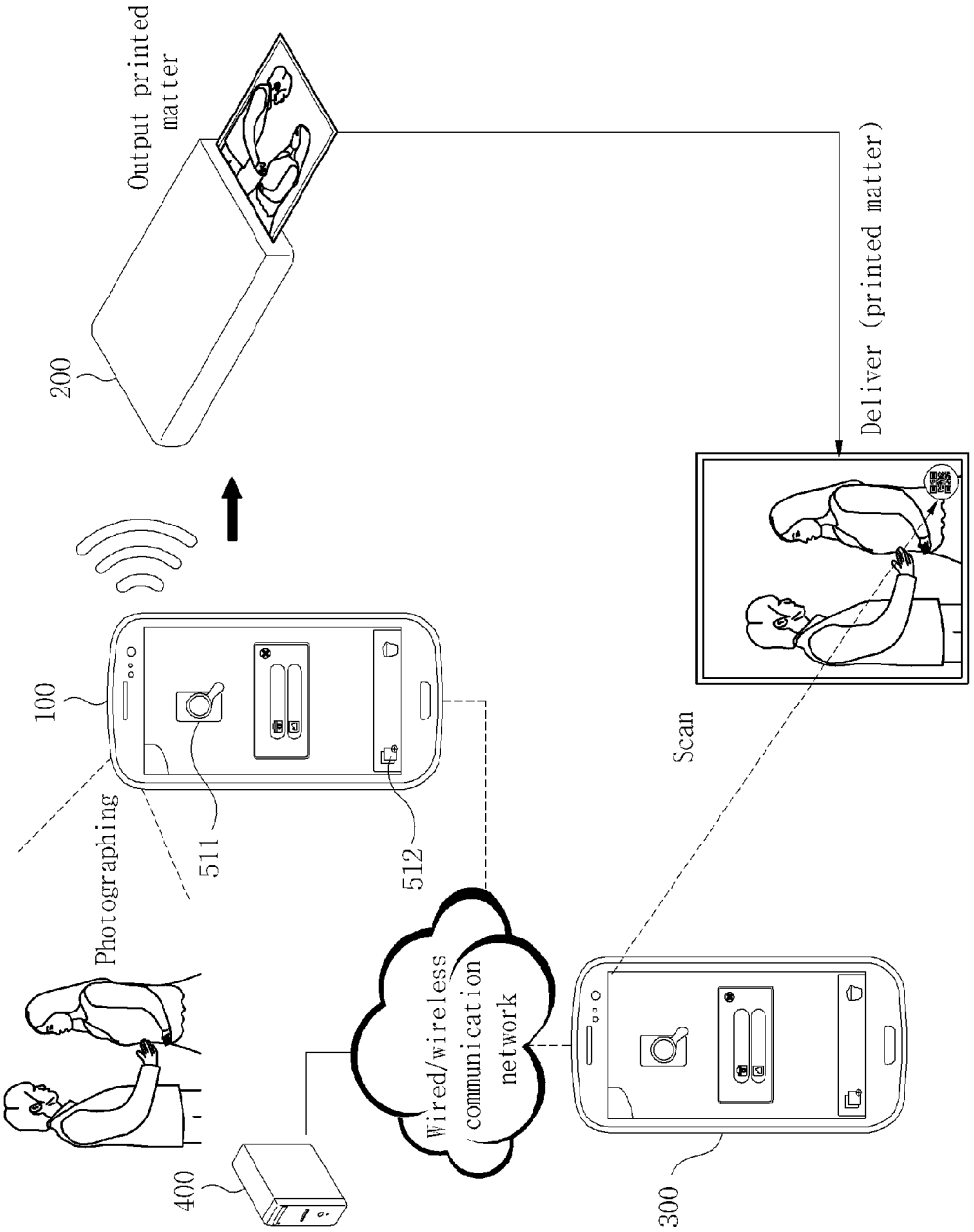
FIG. 1 is a block diagram of a content delivery service system in accordance with an embodiment of the present invention.

FIG. 1 is a block diagram of a content delivery service system in accordance with an embodiment of the present invention.

As illustrated in FIG. 1, the content delivery service system in accordance with an embodiment of the present invention includes the terminal 100 of a user A (also called a terminal A), a printing device 200, the terminal 300 of a user B (also called a terminal B), and a server 400.

When a content delivery service app is executed, the terminal 100 of the user A selects (or captures or obtains) a desired image (or a photo) (e.g., from an album) and edits (including input) content to be delivered. When the editing is completed, the terminal 100 of the user A sends information about the editing of the content to the server 400 along with information about the image.

The server 400 stores the image and the content edit information in its specific repository and sends the serial number of the repository and the storage information of the server 400, such as an URL address, to the terminal 100 of the user A.

Furthermore, the terminal 100 of the user A generates recognition code (e.g., QR code or barcode) on which the storage information received from the server 400 is recorded, and inserts the generated recognition code into the selected photo. In the present invention, QR code is illustrated as being an example of the recognition code, for convenience of description, but a variety of type of recognition code may be applied to the present invention. For example, the outline of a specific thing in a photo (or an image) may be used as the recognition code, or color code formed of a bar (or a specific pattern) including a plurality of colors may be used as the recognition code. If the outline of a specific thing is used as the recognition code, the recognition code is included in the photo itself of the terminal 100 of the user A without inserting the recognition code into the photo. Accordingly, in the present invention, a phrase "recognition code is inserted into an image" also includes the meaning that "recognition code is included in an image".

Furthermore, in the present invention, an "image" has been illustrated as being an example, for convenience of description, but the image is a concept including all files, such as photos, PDF files, and various text files that may be fetched and read by a smart device.

Thereafter, the terminal 100 of the user A sends the image (or the photo) into which the QR code has been inserted to the printing device 200 so that it prints the image.

In accordance with an embodiment of the present invention, the printing device 200 is a portable printing device equipped with short-distance wireless communication means, and receives the image from the terminal 100 of the user A through the short-distance wireless communication means. Furthermore, the printing device 200 outputs the printed matter of the received image.

The short-distance wireless communication means functions to perform communication with the user terminals 100 and 300 and may perform any one of short-distance wireless communication protocols, such as Bluetooth or Radio Frequency Identification (RFID), infrared Data Association (IrDA), an Ultra Wideband (UWB), Zigbee (IEEE 802.15.4), and Wi-Fi.

In accordance with an embodiment of the present invention, however, the content delivery service system may be configured so that the printing device 200 is a printing device for offline and configured to receive the image through wired communication with the terminal 100 of the user A.

Matter (including the QR code) printed as described is delivered to the offline user B.

The terminal 300 of the user B scans the QR code of the delivered photo (i.e., the printed matter including the QR code) and detects information about the URL of the server 400 and the serial number of the repository (e.g., a DB server) in the QR code. Furthermore, the terminal 300 of the user B accesses the server 400 based in the detected URL information, downloads an image file in which the content has been recorded from the repository having the serial number within the server 400, and represents the recorded image file on a screen or executes the recorded image file.

The user B of the terminal 300 is unable to view content not represented in the printed matter along with the image (or the photo) through an app screen.

A series of operations of the terminal 300 of the user B may be automatically executed without a user input (e.g., a button touch). In such a case, users may be provided with enhanced reality service.

The user terminal 100, 300 may be a laptop computer, a mobile communication terminal (e.g., a mobile phone, a PDA, a smart phone, or a tablet PC) or a desktop PC.

The user terminal 100, 300 may include a QR code reader, a wireless communication unit, an Audio/Video (A/V) input unit, a user input unit, a sensing unit, an output unit, memory, an interface unit, a control unit, and a power supply unit.

The user terminal 100, 300 may include a device or app (e.g., a sound store service app) capable of reading QR code or may store the app in its memory. In the case of an app capable of reading the QR code, a user may download the corresponding app from the server 400 or an app store and may install the downloaded app on his or her terminal.

A process of editing content to be delivered on an image and generating coded printed matter is described below with reference to FIGS. 2 to 8.

First, the terminal 100 of the service user A (the terminal A) executes a content delivery service app (hereinafter referred to as a "service app"). When a secret view generation menu 512 is clicked on, a guide message that prompts an image to be selected (e.g., "capturing" or "selection from an album") pops up. The main screen 500 of the service app includes a secret view reader 511, a back 514, and a recycle bin 513 in addition to the secret view generation menu 512. The secret view reader 511 functions to recognize the QR code of printed matter in the terminal 300 of the user B and to check edited content. The back 514 functions to return to a previous step. The recycle bin 513 functions to delete an image in the album of a secret view itself and an edited image (i.e., an image including content) (refer to FIGS. 2 and 3).

When an image is selected in the main screen 500, various menus for editing content are displayed. In the present invention, the meaning "edit content" may include a meaning "input content", "configure content", or "generate content" or may be used in the same meaning as them.

Editable content may include emoticons, sounds, text, 2D animation, three-dimensional (3D) animation, stickers, and videos. To this end, in the present embodiment, a variety of types of input mode 521 are included. More specifically, the variety of types of input mode 521 may include emoticon input mode 521a, sound input mode 521b, text input mode 521c, call input mode 521d, and URL input mode 521e.

Figure 2:
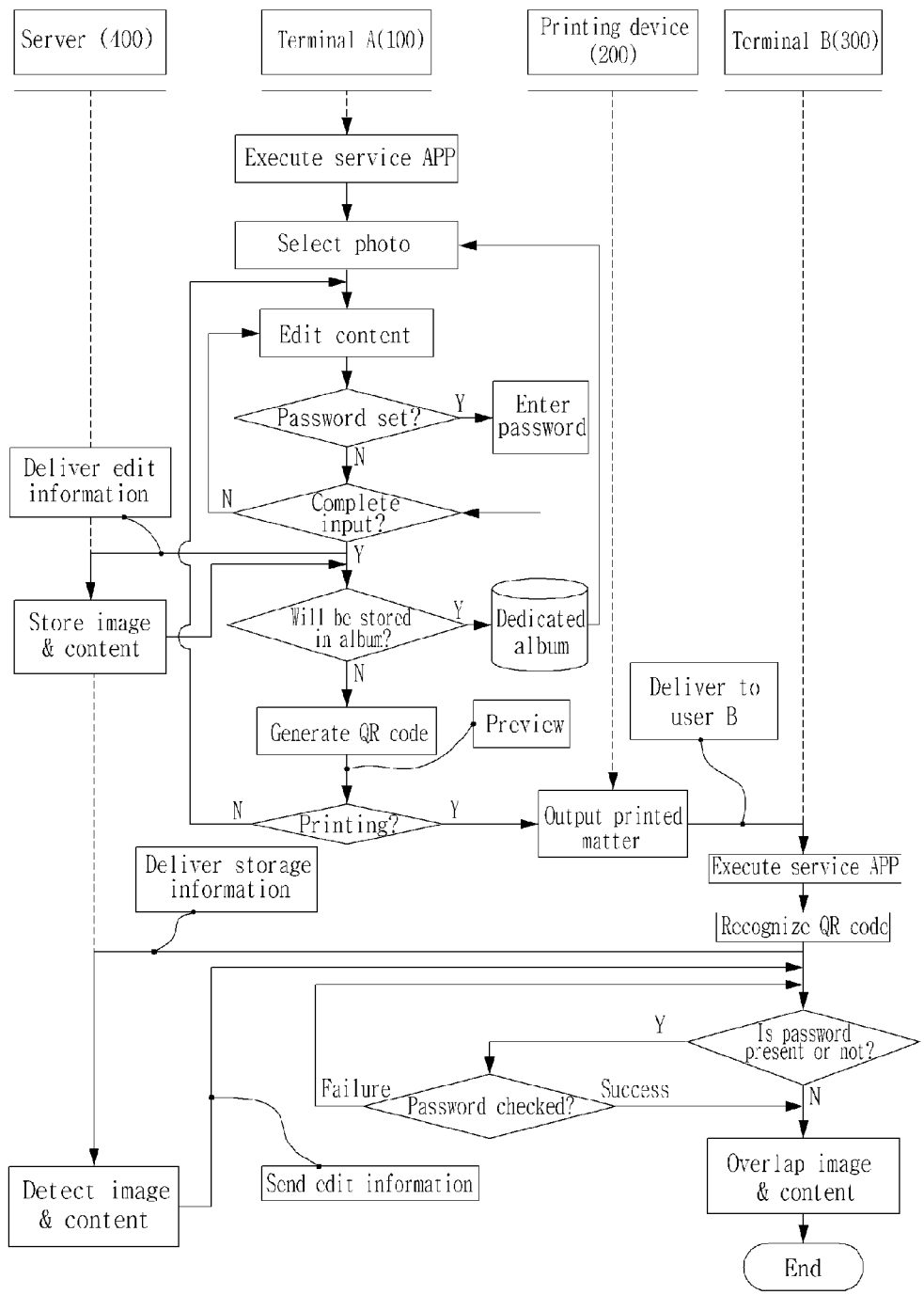
FIG. 2 is a flowchart illustrating an embodiment of the present invention.
Figure 3:
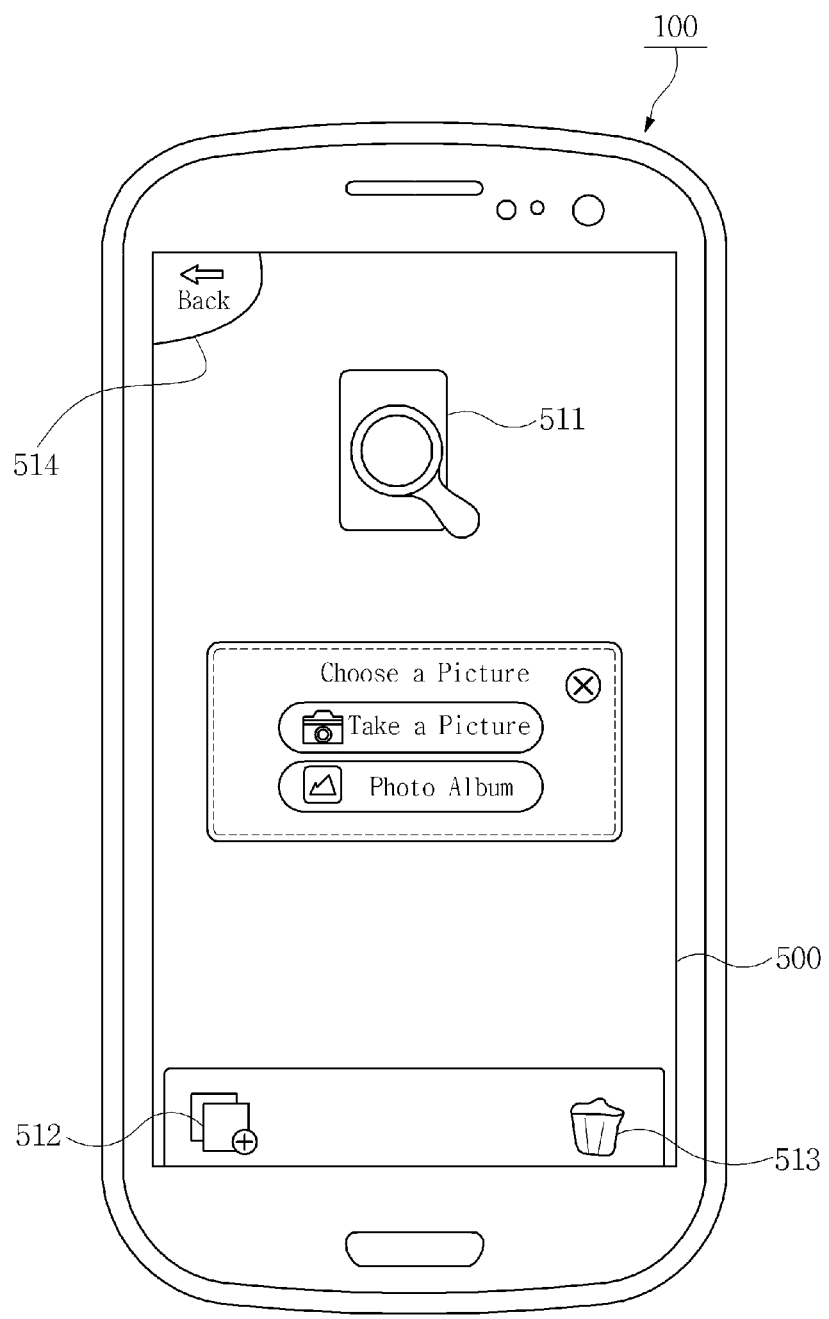
FIGS. 3 to 8 illustrate a process of editing and coding content on an image
Figure 4:
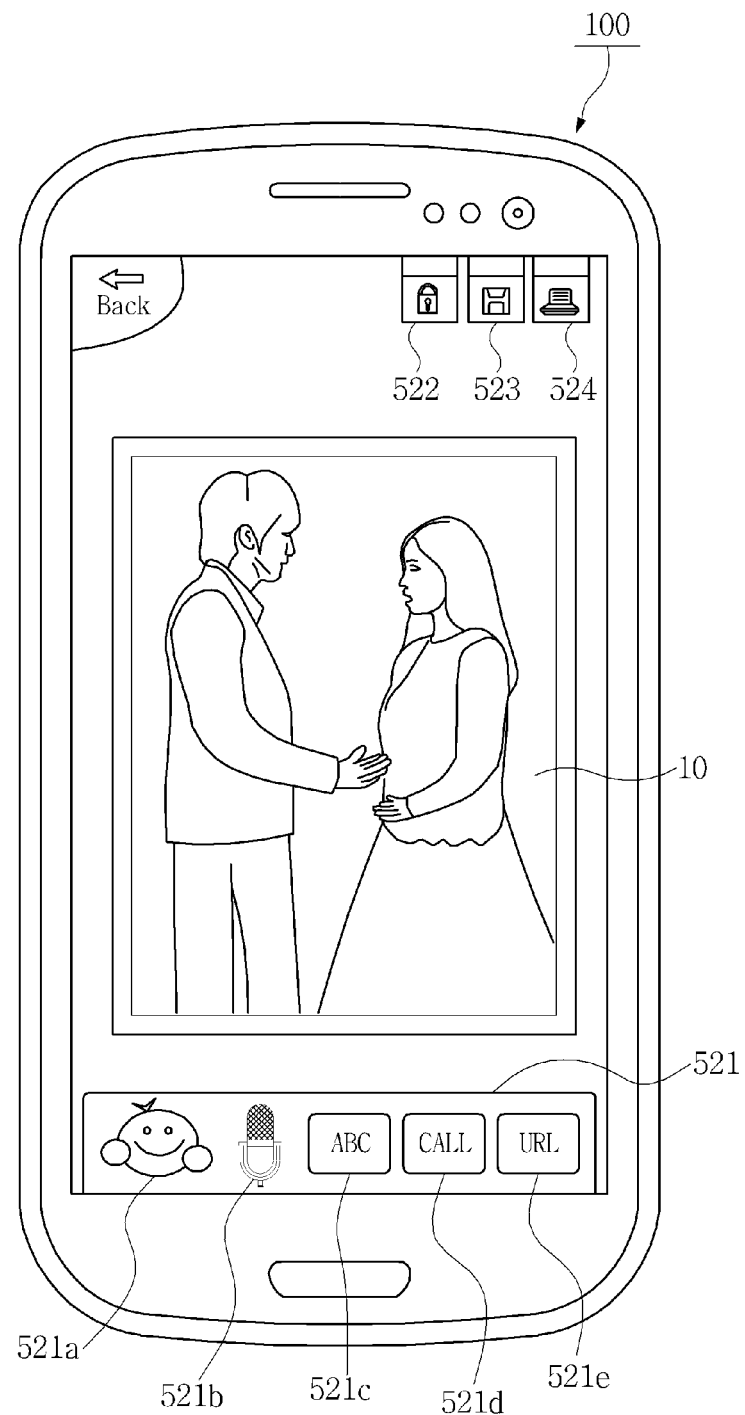

Furthermore, a password setting menu 522, a storage menu 523, and a transmission menu 524 may be included on the right upper side of an app screen for editing (refer to FIGS. 2 and 4).

Figure 5:
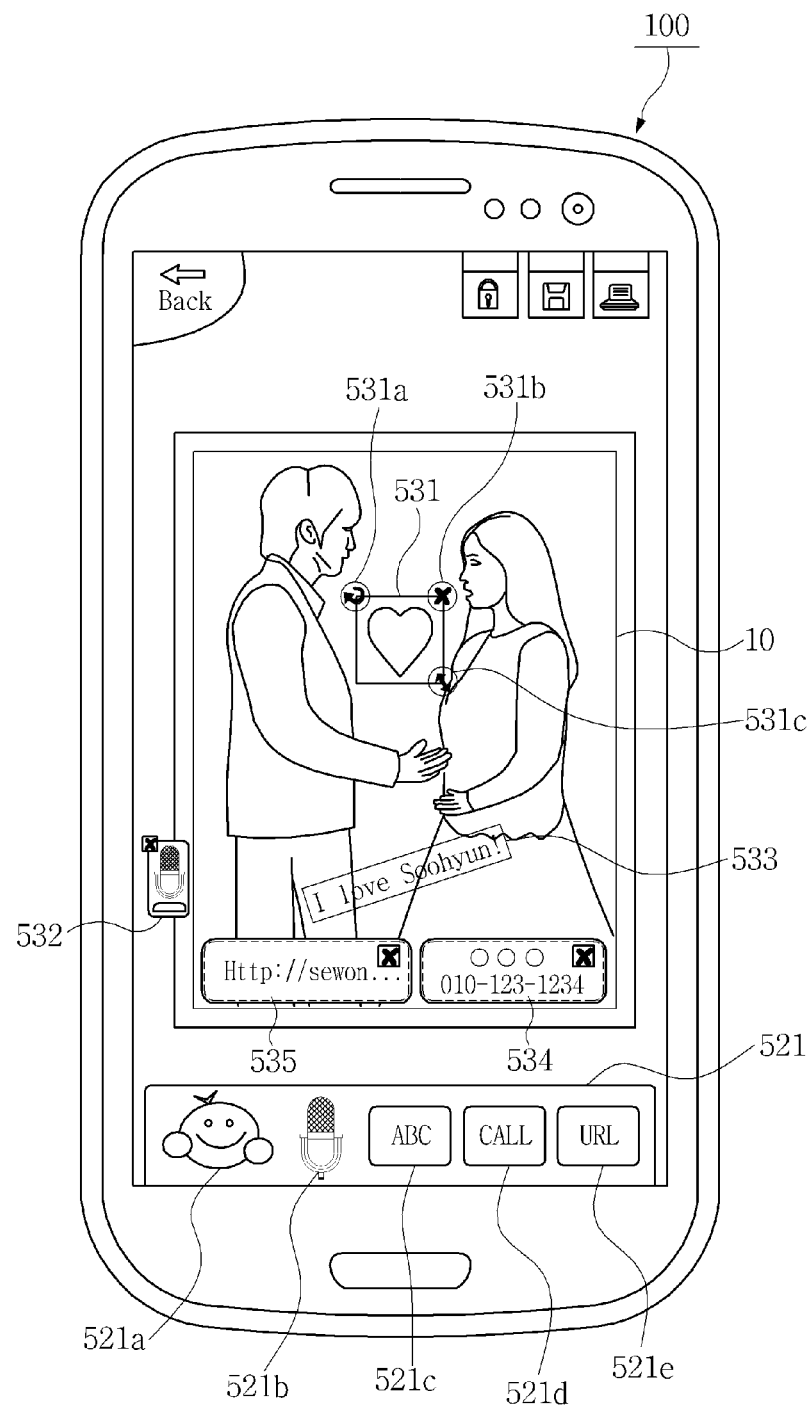

A process of editing content is described in detail below with reference to FIG. 5. First, when the emoticon input mode 521a is touched, a plurality of emoticons is displayed. An emoticon 531 selected by the user from among the plurality of emoticons is overlapped with the selected image 10. The image 10 may be moved to a desired location by dragging the overlapped emoticon 531, the angle (or direction) of the image 10 may be controlled using a tilting button 531a, and the size of the image 10 may be controlled using a size control button 531c. Furthermore, when a delete button 531b is touched, the selected emoticon 531 may be deleted.

Next, when the sound input mode 521b is touched, a desired sound, for example, background music may be inserted or voice may be recorded and inserted. When the sound is input as described above, an indication unit 532 that provides notification of sound input is displayed. A delete button may be included in the indication unit 532 in order to delete an input sound.

Next, when the text input mode 521c is touched, a keyboard capable of inputting text is displayed. The user may input text 533 to be transferred using the keyboard. The size, color, and font of the input text 533 may be selected, the location of the input text 533 may be changed by dragging the input text 533, and the input text 533 may be tilted at a specific angle to the image 10.

Next, when the call input mode 521d is touched, a specific telephone number may be input using the keyboard or a telephone number may be fetched from the telephone directory of the terminal A along with a corresponding name.

Next, when the URL input unit 521e is touched, a specific URL may be input using the keyboard.

The user may edit content in various forms and contents as described above. Furthermore, the generated content may be deleted using the delete button 531b.

Figure 6:
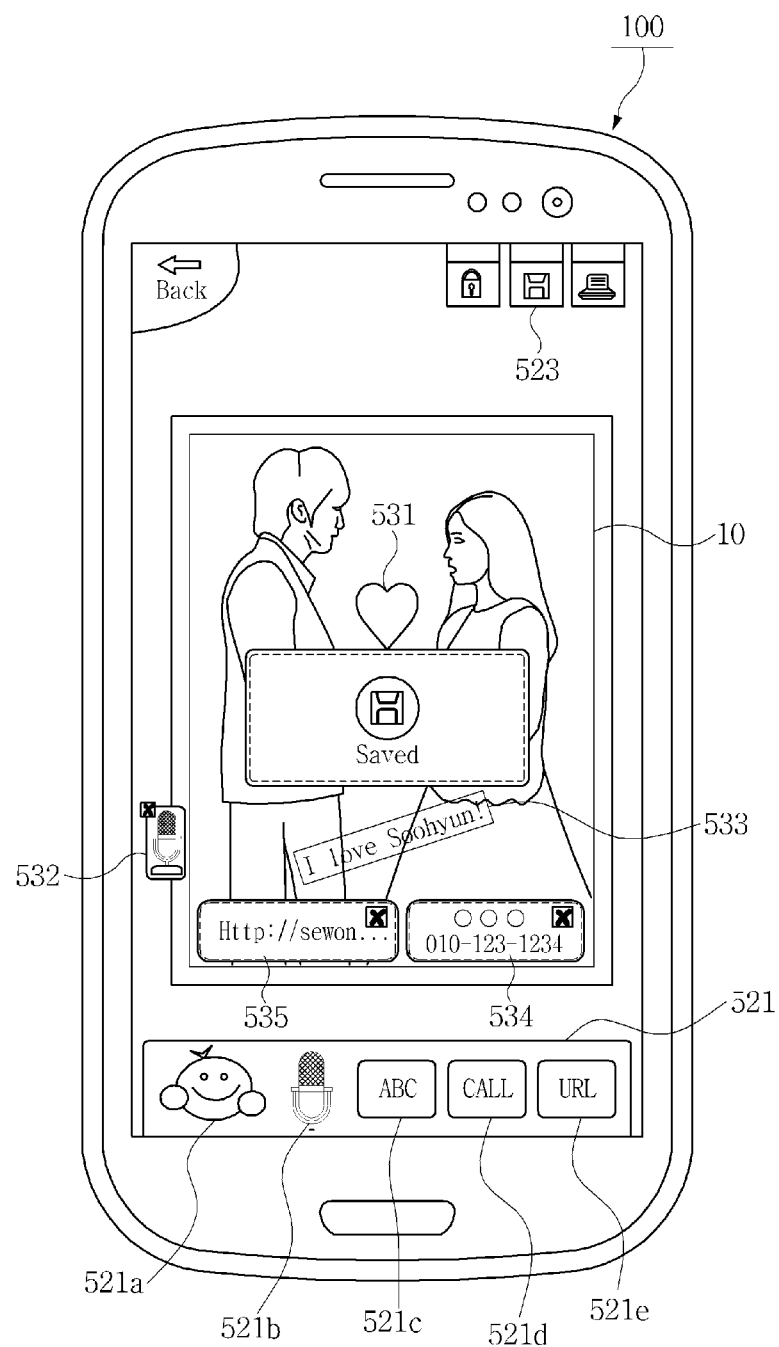

After the editing of the content is completed, the image whose content has been edited is primarily stored in the terminal 100 of the user A by touching the storage menu 523 (refer to FIG. 6). When the storage menu 523 is touched as described above, the image whose content has been edited is stored in the album of the service app itself that is installed on the terminal 100 of the user A. When the edited image is stored in the terminal 100 of the user A as described above, it may be subsequently fetched and printed and the content of the image may be additionally edited. Alternatively, the image stored in the album may be deleted by touching the recycle bin button 531b as described above.

The user A may set a password in the app screen. When the password setting menu 522 is touched in the app screen, a password input window appears along with the keyboard. The user A may input a password (refer to FIGS. 2 and 7).

Next, when the user A touches the transmission menu 524 in the app screen, the image 10, information about the edited content, and the password are transmitted to 400. The server 400 stores the image 10, the content edit information, and the password in a specific repository (refer to FIGS. 2 and 7). The content edit information may include the type, contents, size, angle, color, execution order, coordinate information, and priority of the content.

For example, if the content is text, the contents, size, angle (whether the content is tilted or not), location (coordinate information), color, and font of the content are transmitted and stored in the specific repository.

Furthermore, if the content is a sound or video, the contents of the content and the time when the content is to be executed are transmitted and stored in the specific repository.

Furthermore, if the content is an emoticon, a sticker, or animation, the selected emoticon, sticker, or animation itself is not transmitted, but the ID of the selected emoticon, sticker, or animation is transmitted and stored in the specific repository. In this case, the location (or coordinate information), size, angle, and color of the content are also transmitted and stored in the specific repository.

Furthermore, pieces of content may be simultaneously represented or executed. Alternatively, the pieces of content may be represented or executed in time series. For example, the content may be edited so that a voice file is first executed and text is then represented. In such a case, priority may be assigned to each of the pieces of content, and such priorities are also transmitted and stored in the specific repository of the server 400.

When the image 10, the content edit information, and the password are transmitted and stored in the specific repository of the server 400 as described above, the server 400 sends information about the storage to the terminal 100 of the user A. The storage information transmitted to the terminal 100 of the user A includes the content edit information, the serial number of the repository of the server 400 and information about the URL of the server 400 in which the image 10 and the password are stored.

The terminal 100 of the user A generates QR code 20 on which the storage information has been recorded and inserts the QR code 20 into the image 10.

When such a process is performed, a preview screen is displayed on the app screen of the terminal 100 of the user A. The image 10 (including the QR code) to be printed is displayed on the preview screen. At this time, a button 542 capable of inputting the number of copies and a print button 541 are displayed on the app screen 500 (refer to FIGS. 2 and 8).

When the print button 541 is touched in the terminal 100 of the user A, the image 10 of the preview screen is printed through the printing device (refer to 200 of FIG. 1) connected to the terminal 100. In this case, the printing device 200 may include a portable printing device capable of wireless communication or a printing device for offline which is capable of wired communication.

Figure 9:
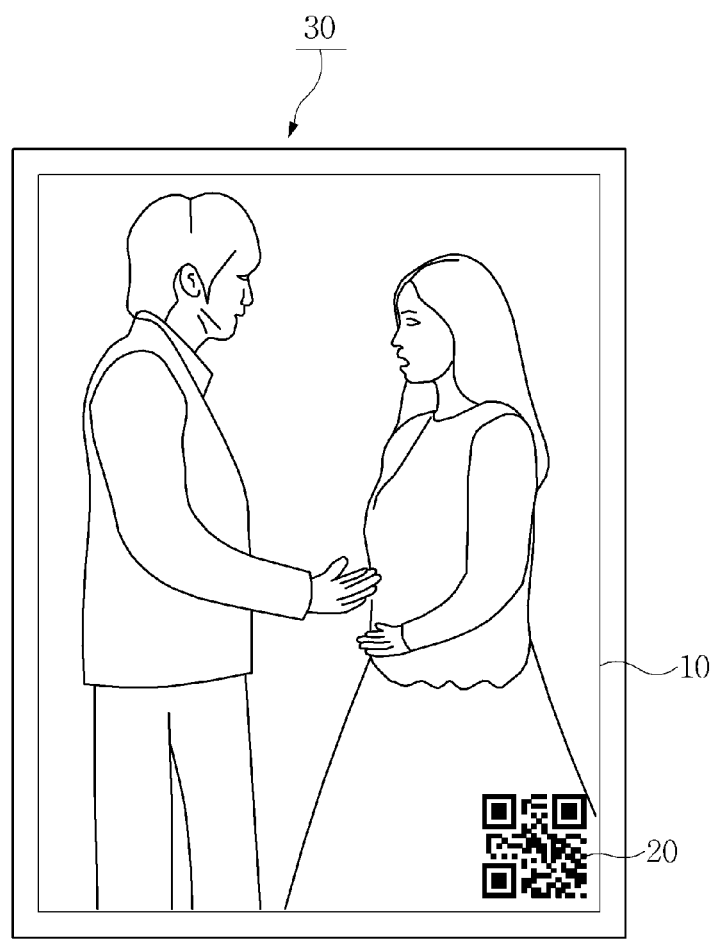
FIG. 9 illustrates printed matter obtained by coding content.
Figure 10:
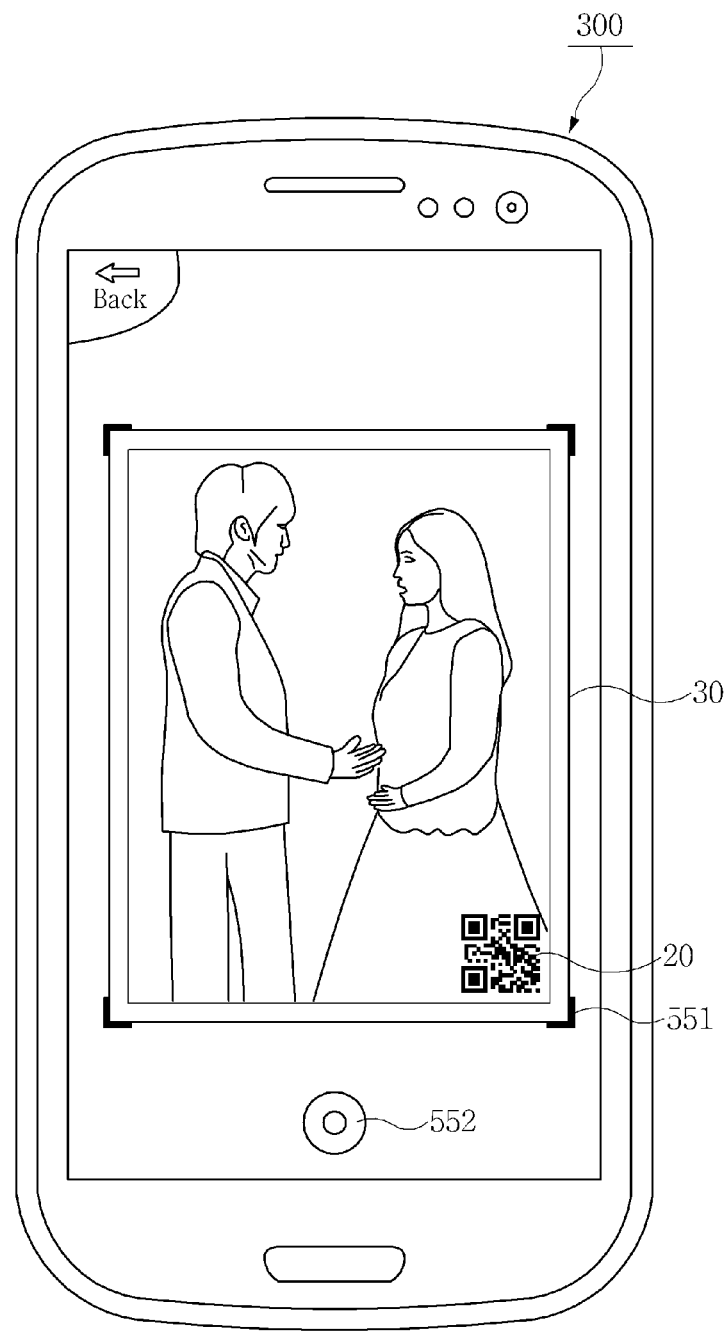
FIGS. 10 to 12 illustrate a process of decoding coded content and checking edited content along with an image.

FIG. 9 illustrates printed matter 30 printed by the printing device 200. It may be seen that the QR code 20 has been inserted into the selected image 10 of the printed matter 300. That is, it may be seen that the printed matter 30 itself does not appear because content to be delivered has been coded into the QR code 20. The user A offline transfers the printed matter 30 to the user B along with the password. In this case, the password may be delivered simultaneously with the printed matter 30, or the password may be delivered separately from the printed matter 30 using a different method, such as a call or e-mail, or at a different time.

A process of checking, by the user B, content is described below with reference to FIGS. 2 and 10 to 12.

First, the user B who has received the printed matter 30 along with the password executes the service app. When the user B touches the secret view reader 511 in the main screen (refer to 500 of FIG. 3), the camera of the terminal 300 of the user B is executed and a square guide frame 551 appears in a display window. In this case, after the printed matter 30 is located within the square guide frame 551, the user B touches a recognition button 552 (refer to FIGS. 2 and 10).

Figure 11:
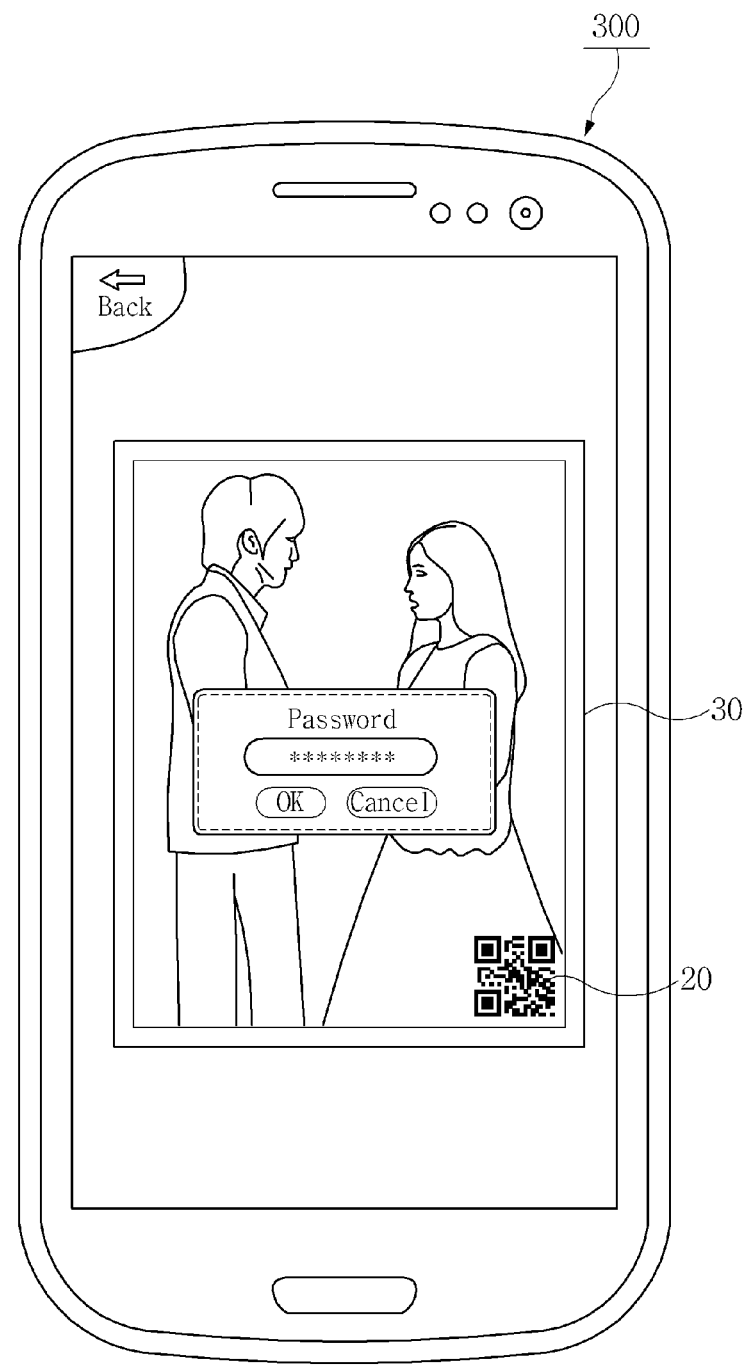
Figure 12:
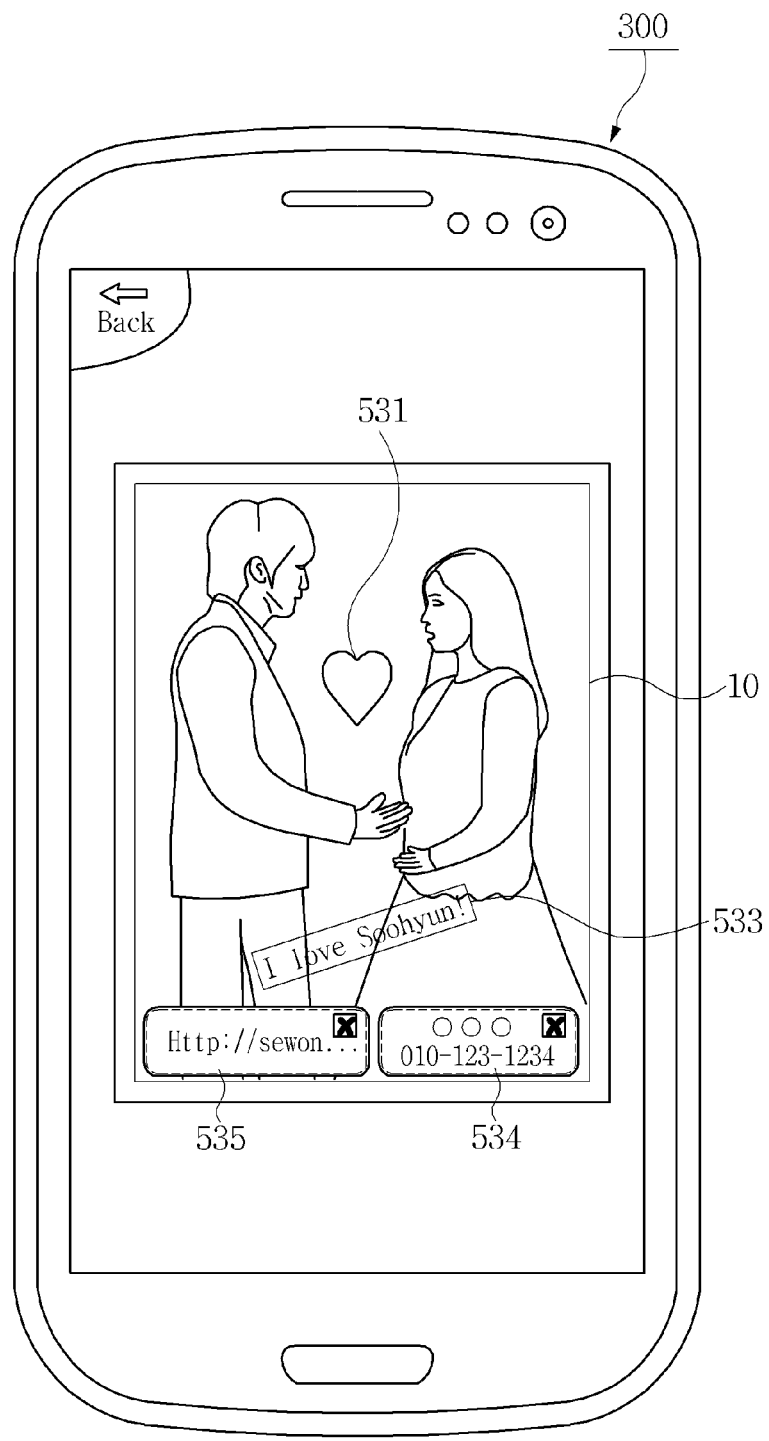

When the QR code 20 is recognized by such an operation, a password input window pops up on the app screen (refer to FIGS. 2 and 11).

When the user B correctly enters the password received from the user A, the terminal 300 of the user B detects the storage information, such as the URL address of the server 400 and the serial number of the repository. The terminal 300 of the user B may access the server 400 based on the storage information detected as described above and may receive the image and the content edit information from the server 400.

Accordingly, in the terminal 300 of the user B, pieces of content 531, 533, 534, and 535 are overlapped with the image 10 and are represented or executed in the app screen. That is, text, an emoticon, animation, and a sticker may be represented on the image 10, and a sound or a video are executed along with the image 10 or executed in order of edited time arrangement (refer to FIGS. 2 and 12).

Furthermore, if a sound or a video is included in content, a separate icon or button may be formed for the repetitive hearing or watching of the content.

Furthermore, when a telephone number 534 overlapping with the image 10 is touched, a call is made to the corresponding telephone number. When a URL 535 is touched, the corresponding URL may be accessed.

Accordingly, the user B may check the pieces of content 531, 533, 534, and 535, edited by the user A, along with the image 10.

An embodiment of the present invention is an example of a secret content delivery service method using printed matter. In the present embodiment, a situation in which the male (e.g., the user A of the terminal 100) delivers a secret message through which the male confesses his love to the female (e.g., the user B of the terminal 300) has been played.

The male (e.g., the user A of the terminal 100) edits the pieces of secret content 531, 533, 534, and 535 on the photo 10 that was photographed along with the female (e.g., the user B of the terminal 300). In this case, the pieces of content 531, 533, 534, and 535 may include text, voice recording, background music, an emoticon, animation, and a video. A password is set in the content edited as described above, and the content is uploaded onto the server 400.

Furthermore, the photo 30 into which the QR code 20 has been inserted is printed and is then delivered to the female (e.g., the user B of the terminal 300) along with the set password.

The female (e.g., the user B of the terminal 300) checks the QR code 20 within the photo 30 that was photographed along with the male (e.g., the user A of the terminal 100) and correctly enters the password. Accordingly, the female (e.g., the user B of the terminal 300) may check the pieces of content 531, 533, 534, and 535 edited by the male (e.g., the user A of the terminal 100).

As described above, since the pieces of content 531, 533, 534, and 535 do not appear in the photo 30 (or the printed matter) itself, the pieces of content 531, 533, 534, and 535 can be secretly delivered. Furthermore, it is effective to guarantee security and protect private life because a password is set.

Figure 13:
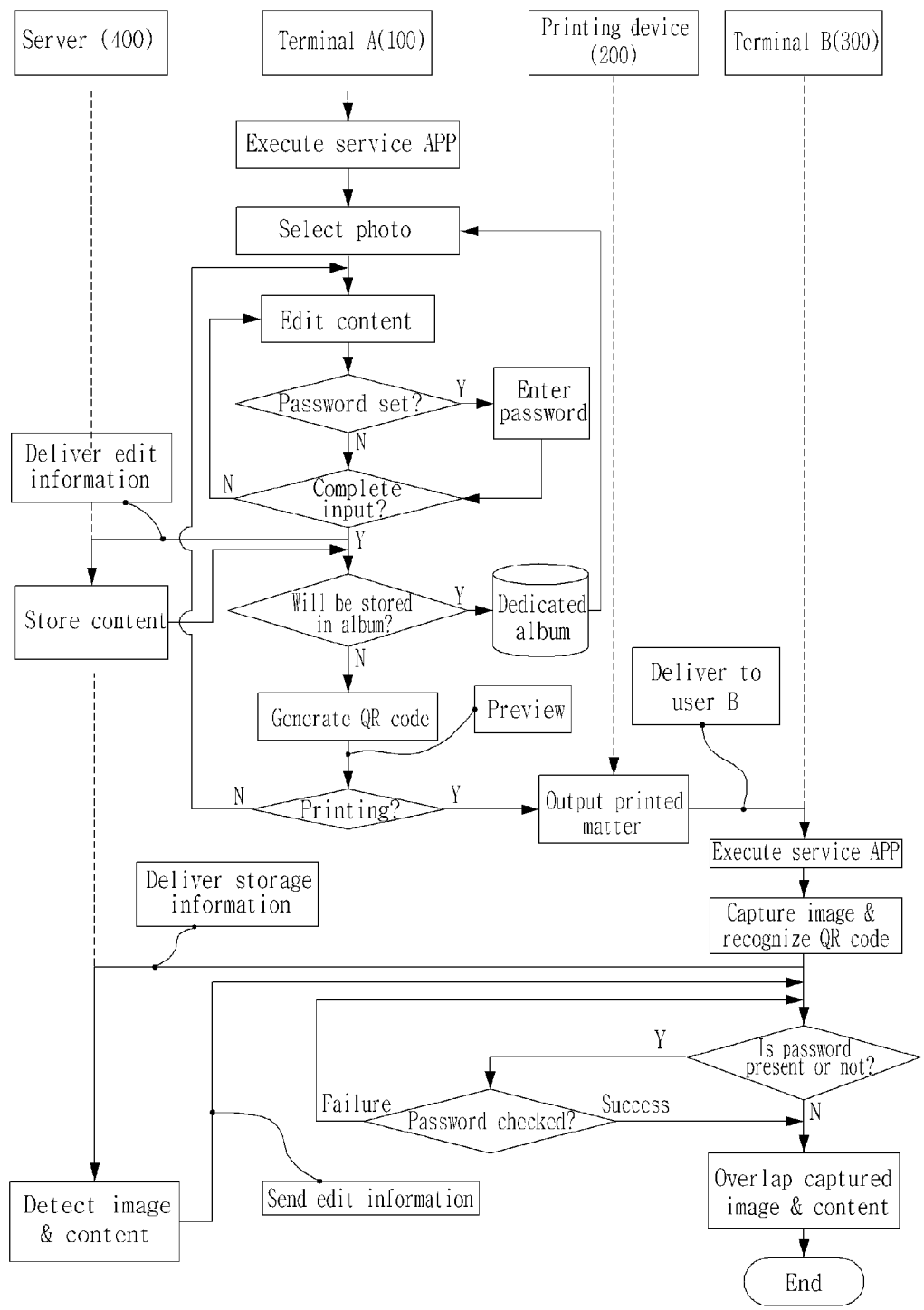
FIG. 13 is a flowchart illustrating another embodiment of the present invention.

FIG. 13 is a flowchart illustrating another embodiment of the present invention.

In the embodiment of FIG. 13, content is edited on an image in the terminal A, and only information about the edited content is transmitted to the server 400 and stored therein. In other words, the embodiment of FIG. 13 is different from that of FIG. 2 in that the terminal A does not send an image itself to the server 400. Accordingly, the server 400 does not send the image to the terminal B. Instead, the terminal B photographs a photo that has been offline received and displays the photo on a screen. Furthermore, the embodiment of FIG. 13 is different from that of FIG. 2 in that the terminal B overlaps content, received from the server 400, and a displayed image and displays the content.

Another embodiment of the present invention is described in detail with reference to FIG. 13.

First, the terminal 100 of the service user A (the terminal A) executes the content delivery service app. When the user A clicks on the secret view generation menu 512, a guide message that prompts an image to be selected pops up (refer to FIG. 3). In this state, a photo may be photographed or may be selected from the album.

Next, the user A edits content (refer to FIGS. 4 and 5), such as text, an emoticon, animation, a sound, video, a URL, and a telephone number, using various menus displayed on the app screen 500. In this case, a process of editing the content is the same as or similar to the aforementioned embodiment, and thus a detailed description thereof is omitted.

Figure 7:
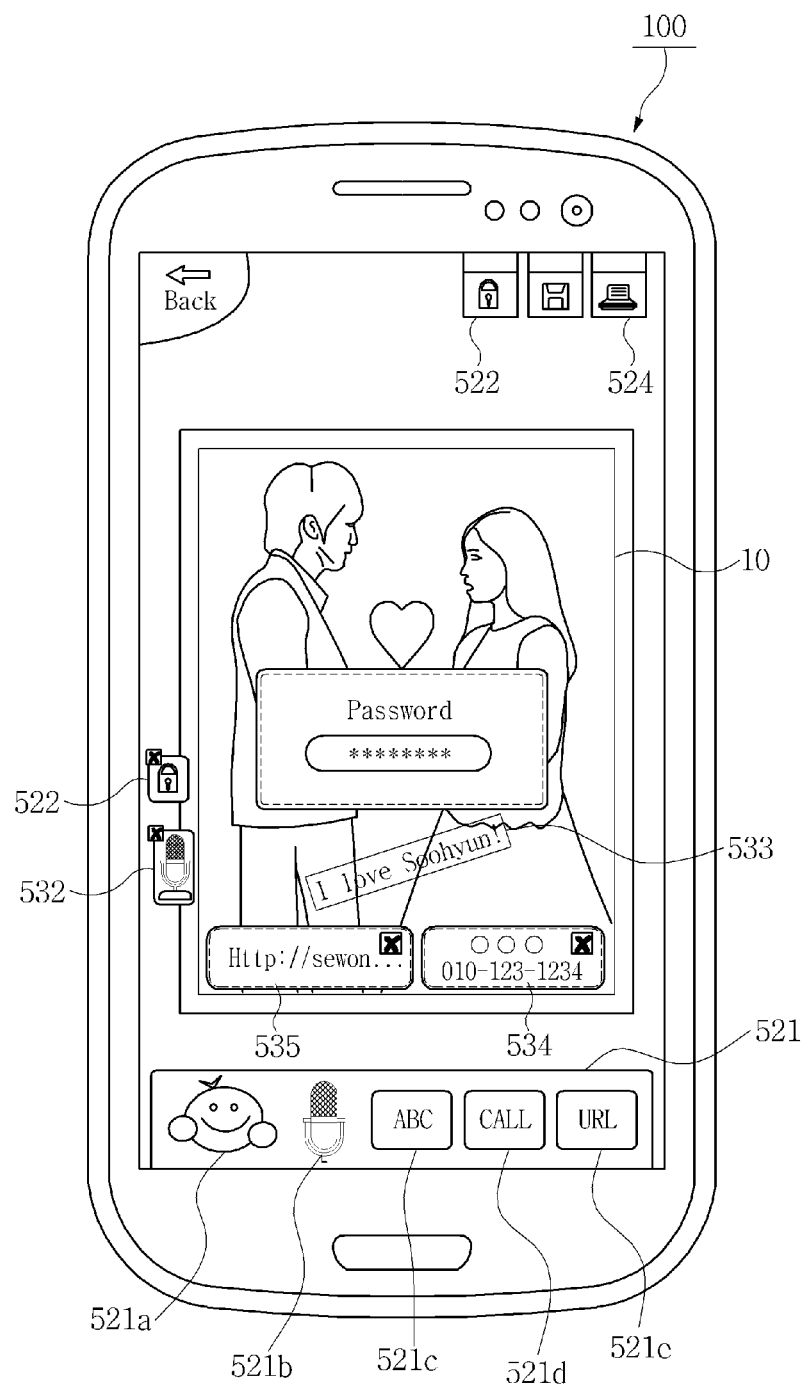
Figure 8:
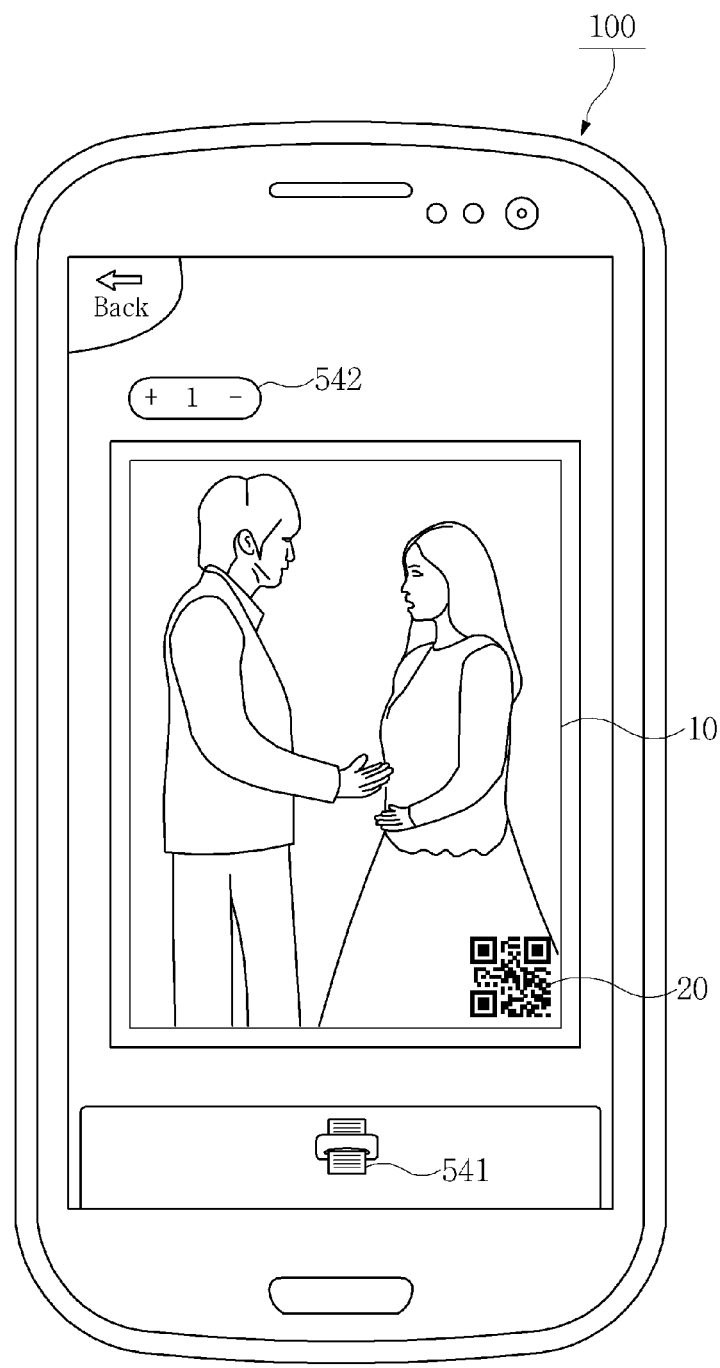

Next, when the user A touches the password setting menu 522 in the app screen 500, the password input window is displayed along with the keyboard, and the user A may enter a password (refer to FIG. 7).

Next, when the user A touches the storage menu 523 in the app screen, the image including the content is stored in the dedicated album of the service app 500 (refer to FIG. 6).

Next, when the user A touches the transmission menu 524 in the app screen 500, information about the edited content and the password are transmitted to the server 400. The server 400 stores the content edit information and the password in its specific repository. As described above, in the present embodiment, the image itself is not transmitted to and stored in the server 400. For reference, the embodiment of FIG. 2 is different from that of FIG. 13 in that an image is also transmitted to the server 400 and stored therein. Accordingly, the embodiment of FIG. 13 can significantly reduce a memory capacity load on the server 400 compared to the embodiment of FIG. 2.

After the content edit information and the password are transmitted to the server 400 and stored therein as described above, the server 400 sends information about the storage to the terminal 100 of the user A. The storage information that is transmitted to the terminal 100 of the user A may include the content edit information, and the serial number of the repository of the server 400 and information about the URL of the server 400 in which the password has been stored.

The terminal 100 of the user A generates QR code 20 on which the storage information has been recorded and inserts the QR code 20 into the image 10.

When such a process is performed, a preview screen is displayed on the app screen 500 of the terminal 100 of the user A. The image 10 (including the QR code) to be printed is displayed on the preview screen. At this time, the button 542 capable of inputting the number of copies and the print button 541 are displayed on the app screen 500 (refer to FIG. 8).

When the user A touches the print button 541 in the terminal 100 of the user A, the printing device 200 prints the image 10 of the preview screen.

The QR code 20 has been inserted into the selected image 10 of the printed matter 300. The user A offline delivers the printed matter 30 to the user B along with the password. In this case, the password may be delivered simultaneously with the printed matter 30 or may be delivered separately from the printed matter 300 using another method, such as a call or e-mail, or at a different time.

A process of checking, by the user B, content not appearing on the printed matter 30 is described below.

When the printed matter 30 is delivered along with the password, the user B executes the service app. When the user B touches the secret view reader 511 in the main screen (refer to 500 of FIG. 3), the camera of the terminal 300 of the user B is executed and the square guide frame 551 is displayed on the display window. In this case, the user B places the printed matter 30 in the square guide frame 551 and touches the photographing & recognition button 552 (refer to FIG. 10).

An image of the printed matter 30 is obtained (or captured) and the QR code 20 is recognized by such an operation. The embodiment of FIG. 2 is different from the present process in that only the QR code 20 is recognized, but an image itself is not captured.

When the QR code 20 is recognized, a password input window pops up in the app screen (refer to FIG. 11). When the user B correctly enters the password received from the user A, the terminal 300 of the user B detects storage information, such as the URL and the serial number of the repository of the server 400. The terminal 300 of the user B may access the server 400 based on the storage information detected as described above, and receives content edit information from the server 400. The embodiment of FIG. 2 is different from the present process in that not only the content edit information, but the image itself are transmitted.

Figure 14:
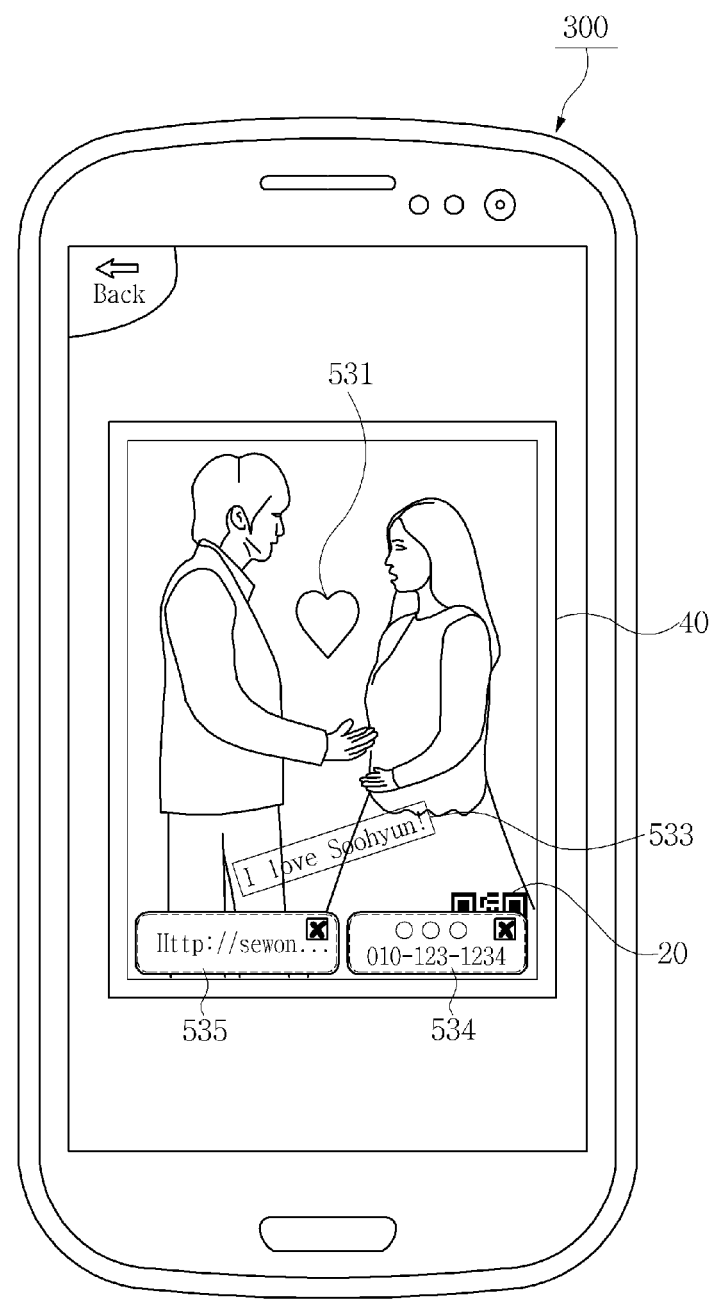
FIG. 14 illustrates a process of checking content in a terminal B in the embodiment of FIG. 13.

Accordingly, the terminal 300 of the user B displays a captured image 40 on the app screen, and thus the pieces of content 531, 533, 534, and 535 are overlapped and represented or executed on the displayed image. From FIG. 14, it may be seen that the image 40 including the QR code 20 is displayed because the image obtained by photographing the offline delivered printed matter is displayed. In contrast, in FIG. 12, QR code is not displayed because an image is transmitted by the server 400.

Furthermore, a content delivery service method in accordance with yet another embodiment of the present invention may include a method of editing content on an image, encrypting the edited content using recognition code, such as QR, without sending the edited content to the server 400, printing the encrypted content, decoding the recognition code, and checking the content.

Such a method is described in more detail below.

First, the terminal A executes the service app, and an image is selected.

Content is edited on the selected image in the app screen. The content may include text, a sound, video, an emoticon, animation, and a sticker as in the aforementioned embodiments.

Next, the terminal A generates specific recognition code on which the contents of the content have been recorded and inserts the specific recognition code into the image.

The terminal A sends the image into which the recognition code has been inserted to the printing device 200, and the printing device 200 prints the image.

When the printing device offline delivers the printed matter to the terminal B, the terminal B executes the service app and captures (or obtains or photographs) the image of the printed matter.

Next, the terminal B recognizes the recognition code in the printed matter and extracts the recorded contents of the content from the printed matter.

Next, the terminal B overlaps the extracted content with the obtained image and represents or executes the results, so that the content edited by the terminal A can be checked through the terminal B.

Furthermore, to extract the content from the recognition code is performed by a process of extracting the contents of the content recorded in the data region of the recognition code and converting the contents of the extracted content into content capable of being displayed on a screen of the terminal B.

A password may be set when the recognition code is generated in the terminal A. In such a case, when a password authentication procedure is performed and an authenticated password is entered through the terminal B, contents recorded in the recognition code may be overlapped with the captured image and displayed.

In accordance with the present invention, there are advantages in that a service subscriber A can deliver content so that printed matter itself does not appear in the content to be delivered and a service subscriber B who has received the printed matter from the service subscriber A can check the content edited by the service subscriber A.

Furthermore, there is an advantage in that content does not appear in printed matter itself because a service subscriber A edits, codes, and prints the content to be delivered along with an image.

Furthermore, there is an advantage in that a service subscriber B who has received printed matter from a service subscriber A can check content edited by the service subscriber A along with an image by decoding the recognition code of the printed matter.

In particular, there is an advantage in that a memory capacity load on the server can be significantly reduced because an image itself selected by a service subscriber A is not stored in the server and a service subscriber B captures an image of printed matter that has been offline delivered and displays the image.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A content delivery service method using printed matter, comprising:
    executing, by a first terminal, a service app and selecting an image;
    editing content on the selected image in an app screen of the first terminal;
    sending, by the first terminal, the image and information about the edited content to a server;
    storing, by the server, the image and the information about the edited content and sending information about the storage to the first terminal;
    generating, by the first terminal, specific recognition code in which the storage information has been recorded and inserting the specific recognition code into the image; and
    sending, by the first terminal, the image into which the recognition code has been inserted to a printing device so that the image is printed by the printing device,
    executing, by a second terminal, a service app and detecting the information about the storage by recognizing the recognition code in printed matter that has been offline delivered;
    accessing, by the second terminal, the server based on the detected storage information and receiving the image and the content edit information from the server; and
    representing or executing, by the second terminal, the image and the edited content based on the received edit information.

2. The content delivery service method of claim 1, wherein the representing or executing comprises: overlapping the content on a displayed image.

3. The content delivery service method of claim 1, wherein the content comprises at least any one of text, a sound, an emoticon, two-dimensional (2D) animation, three-dimensional (3D) animation, a sticker, and a video.

4. The content delivery service method of claim 3, wherein the app screen of the first terminal provides at least any one of text input mode, sound input mode, emoticon input mode, 2D animation input mode, 3D animation input mode, sticker input mode, and video input mode so that a user is able to edit the content on the selected image.

5. The content delivery service method of claim 1, wherein the content edit information comprises one or more of a type, contents, size, angle, color, execution order, coordinate information, and priority of the content.

6. The content delivery service method of claim 1, wherein the storage information recorded in the recognition code comprises a serial number of a repository of the server or information about a URL of the server in which the image or the content edit information is stored.

7. The content delivery service method of claim 1, further comprising setting a password in the app screen of the first terminal.

8. The content delivery service method of claim 7, further comprising entering the password that allows access to the server in an app screen of the second terminal.

9. The content delivery service method of claim 1, further comprising storing the content edited on the image in the first terminal after editing the content is edited on the image.

10. A content delivery service method using printed matter, comprising:
    executing, by a first terminal, a service app and selecting an image;
    editing content on the selected image in an app screen of the first terminal;
    sending, by the first terminal, information about the edited content to a server;
    storing, by the server, the information about the edited content and sending information about the storage to the first terminal;
    generating, by the first terminal, specific recognition code in which the storage information has been recorded and inserting the specific recognition code into the image; and
    sending, by the first terminal, the image into which the recognition code has been inserted to a printing device so that the image is printed by the printing device,
    offline delivering printed matter printed by the printing device;
    executing, by a second terminal, a service app, obtaining the image of the printed matter, and recognizing the recognition code in the printed matter;
    detecting the storage information recorded in the recognition code, accessing, by the second terminal, the server based on the detected storage information, and receiving the content edit information from the server; and
    displaying, by the second terminal, the image of the printed matter and representing or executing the content based on the received edit information.

11. The content delivery service method of claim 10, wherein the representing or executing comprises: overlapping the content on the displayed image.

12. The content delivery service method of claim 10, wherein the content comprises at least any one of text, a sound, an emoticon, two-dimensional (2D) animation, three-dimensional (3D) animation, a sticker, and a video.

13. The content delivery service method of claim 12, wherein the app screen of the first terminal provides at least any one of text input mode, sound input mode, emoticon input mode, 2D animation input mode, 3D animation input mode, sticker input mode, and video input mode so that a user is able to edit the content on the selected image.

14. The content delivery service method of claim 10, wherein the content edit information comprises one or more of a type, contents, size, angle, color, execution order, coordinate information, and priority of the content.

15. The content delivery service method of claim 10, wherein the storage information recorded in the recognition code comprises a serial number of a repository of the server or information about a URL of the server in which the image or the content edit information is stored.

16. The content delivery service method of claim 10, further comprising setting a password in the app screen of the first terminal.

17. The content delivery service method of claim 16, further comprising entering the password that allows access to the server in an app screen of the second terminal.

18. The content delivery service method of claim 10, further comprising storing the content edited on the image in the first terminal after editing the content is edited on the image.

19. A content delivery service method using printed matter, comprising:

executing, by a first terminal, a service app and selecting an image;

editing content on the selected image in an app screen of the first terminal;

generating, by the first terminal, specific recognition code in which contents of the content have been recorded and inserting the specific recognition code into the image; and sending, by the first terminal, the image into which the recognition code has been inserted to a printing device so that the image is printed by the printing device, offline delivering printed matter printed by the printing device;

executing, by a second terminal, a service app and obtaining the image of the printed matter;

recognizing the recognition code in the printed matter and extracting the recorded contents of the content; and overlapping and representing or executing, by the second terminal, the obtained image and the extracted content.

20. The content delivery service method of claim 19, wherein the recognizing of the recognition code in the printed matter and the extracting of the recorded contents of the content comprises: extracting the contents of the content recorded in a data region of the recognition code and converting the extracted contents of the content into content capable of being displayed on a screen of the second terminal.

* * * * *